C. R. GREUTER.
GUIDE RING FOR ELASTIC FLUID ENGINES.
APPLICATION FILED JAN. 21, 1914.

1,212,764.

Patented Jan. 16, 1917.
2 SHEETS—SHEET 1.

WITNESSES
G. V. Rasmussen
Elmer Young

INVENTOR
CHARLES R. GREUTER
BY
ATTORNEYS

C. R. GREUTER.
GUIDE RING FOR ELASTIC FLUID ENGINES.
APPLICATION FILED JAN. 21, 1914.
1,212,764.
Patented Jan. 16, 1917.
2 SHEETS—SHEET 2.
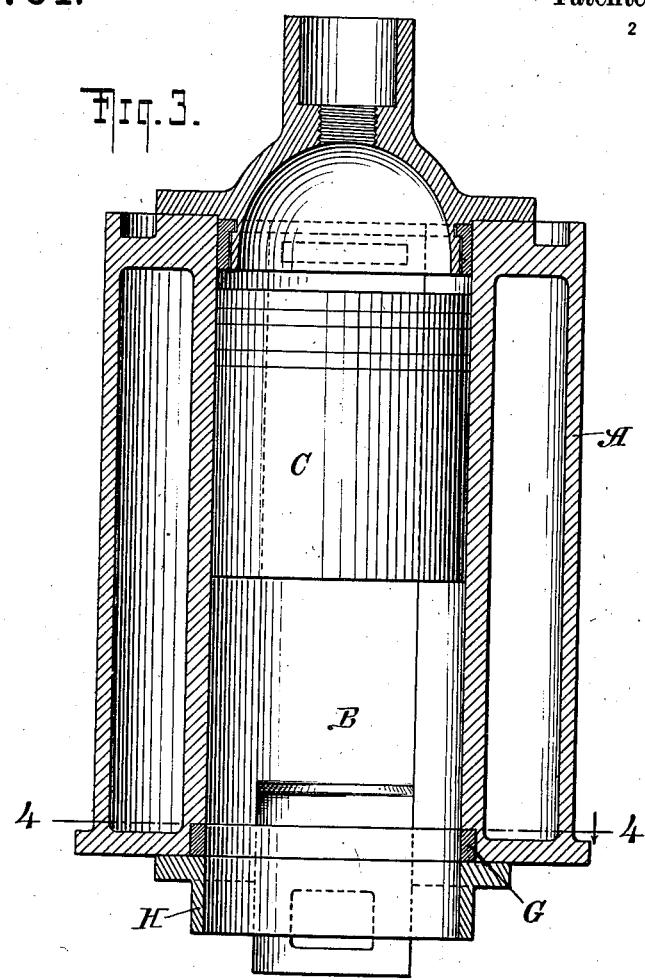
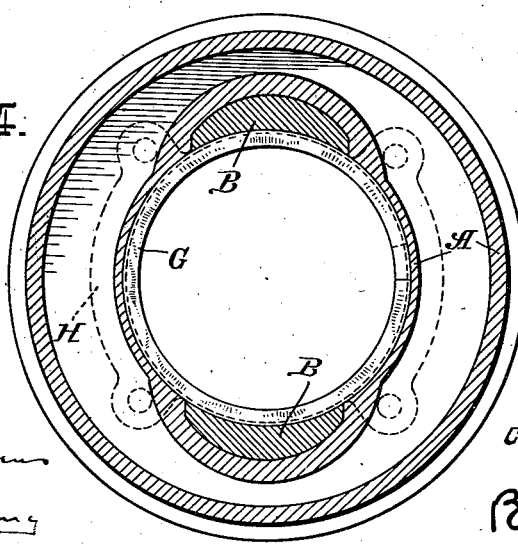
WITNESSES
INVENTOR
CHARLES R. GREUTER
BY
ATTORNEYS

UNITED STATES PATENT OFFICE.

CHARLES R. GREUTER, OF SAUGUS, MASSACHUSETTS, ASSIGNOR, BY MESNE ASSIGNMENTS, TO JOHN T. PRATT, OF NEW YORK, N. Y.

GUIDE-RING FOR ELASTIC-FLUID ENGINES.

1,212,764.  Specification of Letters Patent.  Patented Jan. 16, 1917.

Application filed January 21, 1914. Serial No. 813,378.

*To all whom it may concern:*

Be it known that I, CHARLES R. GREUTER, a citizen of the United States, residing at Saugus, in the county of Essex and State of Massachusetts, have invented a new and useful Improvement in Guide-Rings for Elastic-Fluid Engines, of which the following is a specification.

My invention relates to elastic fluid engines in which a piston operates in a cylinder, and in which valves arranged to slide back and forth in a direction parallel to the movement of the piston, are placed within the cylinder; said valves being either in the form of semi-cylindrical sleeves, or of portions of sleeves of less than a semi-circle in section, sliding longitudinally within the cylinder; or of crescent, or other cross section embedded in the walls of the cylinder, the function of these valves being to control the entrance and exit of the elastic fluid, such as steam, gas, compressed air, or the like, to and from the cylinder. Such valves, as at present constructed, are held in place either solely by the piston, or by the combined action of the piston and of a guide ring at the head end of the cylinder.

It has been found by experience that when the piston is at the extreme end of the stroke nearest the head end of the cylinder, or near the head end, there is a tendency for the valves to leave the contact with the walls of the cylinder or the valve seat at or near the crank end. This tendency may cause objectionable and injurious knocking or slapping of the valves; increasing wear, producing noise, and permitting the valves to become overheated and possibly warped.

In order to prevent such objectionable slapping of the valves I have provided a guide ring, placed in the cylinder near the crank end. This guide ring operates in connection with an elastic expanding packing ring, the two parts of the device being let into the body of the cylinder in such a manner as to hold the valves close to the walls of the cylinder, even when the piston is at the extreme head end of the stroke.

The construction of the improved guide ring device will be seen by reference to the accompanying drawings, which represent a preferred form of the invention in which similar letters refer to similar parts.

Figure 1:
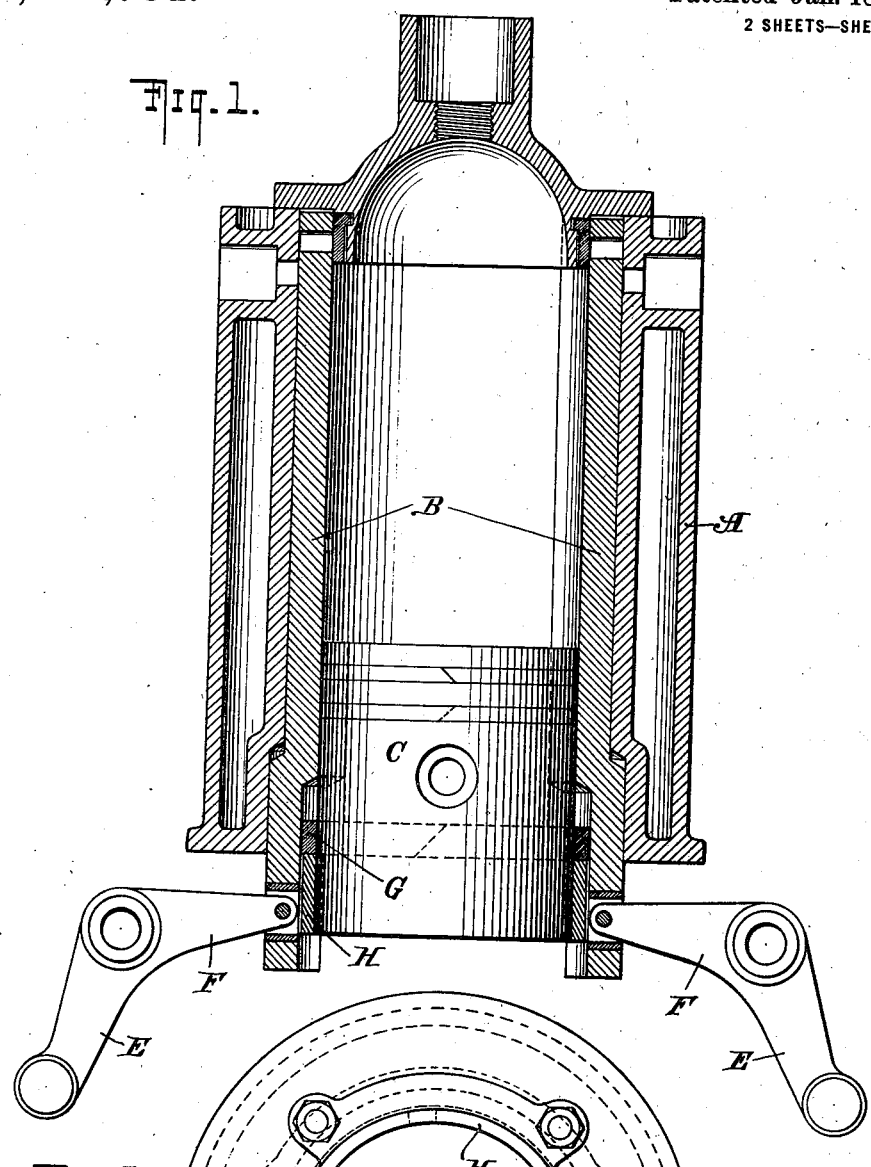
Figure 2:
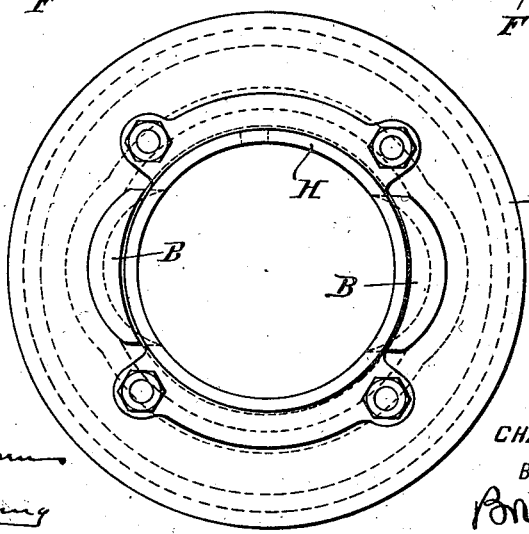

Figure 1, is a vertical section of a cylinder, as of an internal combustion engine showing the manner in which the guide ring is applied; Fig. 2 is a view looking up into the cylinder from below, showing the guide ring, valves, and cylinder; Fig. 3 is a view similar to Fig. 1 but taken at right angles thereto and with the piston at the upper end of the cylinder; and Fig. 4 is a transverse section taken along the line 4—4 of Fig. 3.

A, is a cylinder, fitted with a trunk piston C, and having valves B, B, embedded in the walls, these valves being operated by the bell cranks E F, E F, through any convenient cam or eccentric gear. The valves B, B, are arranged to slide longitudinally in the cylinder and are shown of crescent form in cross section. I do not limit myself to any particular section of valves, but in all cases the surfaces nearest the axis of the cylinder conform to the curvature of the piston, and to the working bore of the cylinder, so that said valves are held in place to a certain extent by the piston. The upper ends of the valves may be held in place by a reëntrant cylinder head, but I do not confine myself to any special device for holding the head ends of the valves.

At the lower end of the cylinder, being the end nearest to the crank, I enlarge the bore of the cylinder, to make room for a corresponding increase in the diameter of the valves, and to permit the introduction of an elastic packing ring G, the internal bore of this ring being of such size as to permit the piston to slide through it, and the external diameter of the said ring G, being such as to fit the inner surface of the lower portion of the valves B, B.

The packing ring G, is fitted into a recess in the bore of the engine cylinder and held in place by a guide ring H, secured to the cylinder by bolts in such a manner that no end movement takes place, and its action is to hold the valves B, B, closely to their seats, even when the piston C, is at or near its uppermost position. The elastic ring G, is fitted closely to the valves B, B, and allows the piston to pass freely through it.

By relieving the contact of the elastic ring G, with the walls of the cylinder A, the elastic pressure may be caused to act more powerfully upon the valves B, B, than upon the remainder of the periphery of the cylinder, thus causing the valves to be held firmly to their seats by the expanding elasticity of the ring G.

The friction of the elastic ring G, against the valves B, B, also acts to relieve the valve gear in part from the inertia effects of the weight of the valves, especially when operated at high speeds, the action being that of a shock absorber in the cylinder in connection with the transmission of the movement of the valve gear to the valves.

I am aware that engines have been made with valves placed within the cylinder and with valves embedded in the cylinder walls, and I do not desire to claim such arrangement of valves broadly.

What I claim, and desire to secure by Letters Patent, is:

1. In an elastic fluid engine, the combination with a cylinder fitted with internal, longitudinally sliding valves, of an elastic packing ring in the cylinder near the crank end, held in place by a guide ring fastened to the cylinder, for the purpose of holding the valves closely in contact with the walls of the cylinder.

2. In an elastic fluid engine, the combination with a cylinder fitted with longitudinally sliding valves embedded in the walls of the cylinder, of an elastic packing ring, fitted to the curved surfaces of the valves, and held in place by a guide ring fastened to the cylinder, for the purpose of holding the valves closely to their seats.

3. In an elastic fluid engine, the combination with a cylinder fitted with internal longitudinally sliding valves, of an elastic packing ring in and fixedly connected with the cylinder, for the purpose of creating such a degree of friction upon the valves as to check the inertia effects and minimize the shock upon the moving parts of the mechanism.

4. In an elastic fluid engine, the combination with a cylinder fitted with internal, longitudinally sliding valves, of a ring within said cylinder at the crank end thereof, said ring being arranged to hold the valves in contact with the cylinder walls.

5. In an elastic fluid engine, the combination with a cylinder fitted with internal, longitudinally sliding valves, of a ring within said cylinder at the crank end thereof, said ring being arranged to hold the valves in contact with the cylinder walls, and means for holding said ring in position.

In testimony whereof, I have hereunto set my hand in the presence of two subscribing witnesses.

CHARLES R. GREUTER.

Witnesses:
HENRY HARRISON SUPLEE,
FRITZ ZIEGLER, Jr.